Sept. 15, 1964   F. H. PRESTWOOD ETAL   3,149,329
PULSE DOPPLER/PROXIMITY SCORER
Filed July 11, 1961   3 Sheets-Sheet 1

INVENTORS
FRANKLIN H. PRESTWOOD
HOMER F. ROLAND
BY
ATTORNEYS

Sept. 15, 1964   F. H. PRESTWOOD ETAL   3,149,329
PULSE DOPPLER/PROXIMITY SCORER Filed July 11, 1961   3 Sheets-Sheet 3

INVENTORS
FRANKLIN H. PRESTWOOD
HOMER F. ROLAND
BY
ATTORNEYS

3,149,329
PULSE DOPPLER/PROXIMITY SCORER

Franklin H. Prestwood, Valparaiso, and Homer F. Roland, Fort Walton Beach, Fla., assignors to the United States of America as represented by the Secretary of the Air Force
Filed July 11, 1961, Ser. No. 123,324
2 Claims. (Cl. 343—13)
(Granted under Title 35, U.S. Code (1952), sec. 266)

The invention described herein may be manufactured and used by or for the United States Government for governmental purposes without payment to us of any royalty thereon.

The invention relates to a pulse Doppler/proximity radar scoring device that detects moving objects within a precise radial distance from the sensing antenna. Hit information is telemetered to an external station when missile penetration occurs within the certain range boundaries.

The principal application of this device is as an airborne scorer to evaluate the hit effectiveness of missile weapons systems. Modern weapons do not necessarily require the missile to make a direct hit for a positive kill, therefore, the scoring requirement is for a means of precisely determining whether or not a missile penetrated the lethal zone around the target piece.

The system of the invention detects moving targets by a combination of various signal phenomena caused by moving objects. The most pronounced of all the moving target effects is the Doppler effect which is expressed as:

$$f_r = \frac{c+v}{c-v} \times (f_t)$$

where $f_r$ is the received echo frequency, the $f_t$ is the transmitter frequency, $c$ is the velocity of light and $v$ is the velocity of the target. Another frequency shift effect, the proximity effect, is caused by inductive-capacitive influence from exposed radiation elements, such as the antenna, coupling to the target. This coupling or loading effect tends to detune the radio frequency stage. As the target moves, different coupling aspects will cause the signal to rise and fall which, in turn, produces a discernible signal. The amount of frequency deviation is based on many factors such as range, aspect angle between target and scorer, and the rate at which the loading takes place, i.e., target velocity. The third phenomenon is the electrostatic charge created by a fast moving object through the atmosphere creating a high level of electrical energy at some fundamental frequency with several harmonics.

This system of detection taught in the invention has numerous advantages over its more complicated and expensive prior art counterparts. Most other scorers work on the modulated frequency modulation technique, a method requiring equipment which suffers from complexity, high cost and inaccuracy at close range. In the present inventon, ranging is independent of moving target frequency shift and is based on radio frequency time propagation, which is $3 \times 10^8$ meters per second. A highly uniform antenna pattern is established about the target, since the look distance is based on the properties of propagation time rather than the conventional system sensitivity. Conventional scorers are adversely effected by normally undesired frequency shifts, while this scorer has the peculiarity of benefiting from this phenomenon. Such frequency shifts arise usually in the near field of the antenna and may be ascribed to radial errors due to relative motion and to the influence which the missile has on the target at close range. The compound effect from capitalizing on these phenomena is an increase in system sensitivity. High operational stability is obtained from both the circuit simplicity and the pulsing technique. For example, precise ranging is established by controlling the pulse duration. Circuit stability is obtained by utilizing a single tube for both transmitting and receiving operations, therefore, if drift occurs it is common to both circuits. Threshold sensitivity, temperature drift, and component changes are compensated by a pulse reservoir circuit within the novel scorer device. Because the transmitter and receiver are the same component, both units are precisely gated in step, therefore, a ranging capability as small as 30 feet is possible. Targets beyond the specified range will not be seen during the interpulse periods since the reflected energy to the pulse reservoir circuit is blanked.

It is a specific object of this invention to provide a scoring device that is small, lightweight, highly reliable and inexpensive enough to employ on an expendable basis.

The nature of the invention, further objects and advantages will appear more fully upon consideration of the embodiments illustrated in the accompanying drawings.

Figure 1:
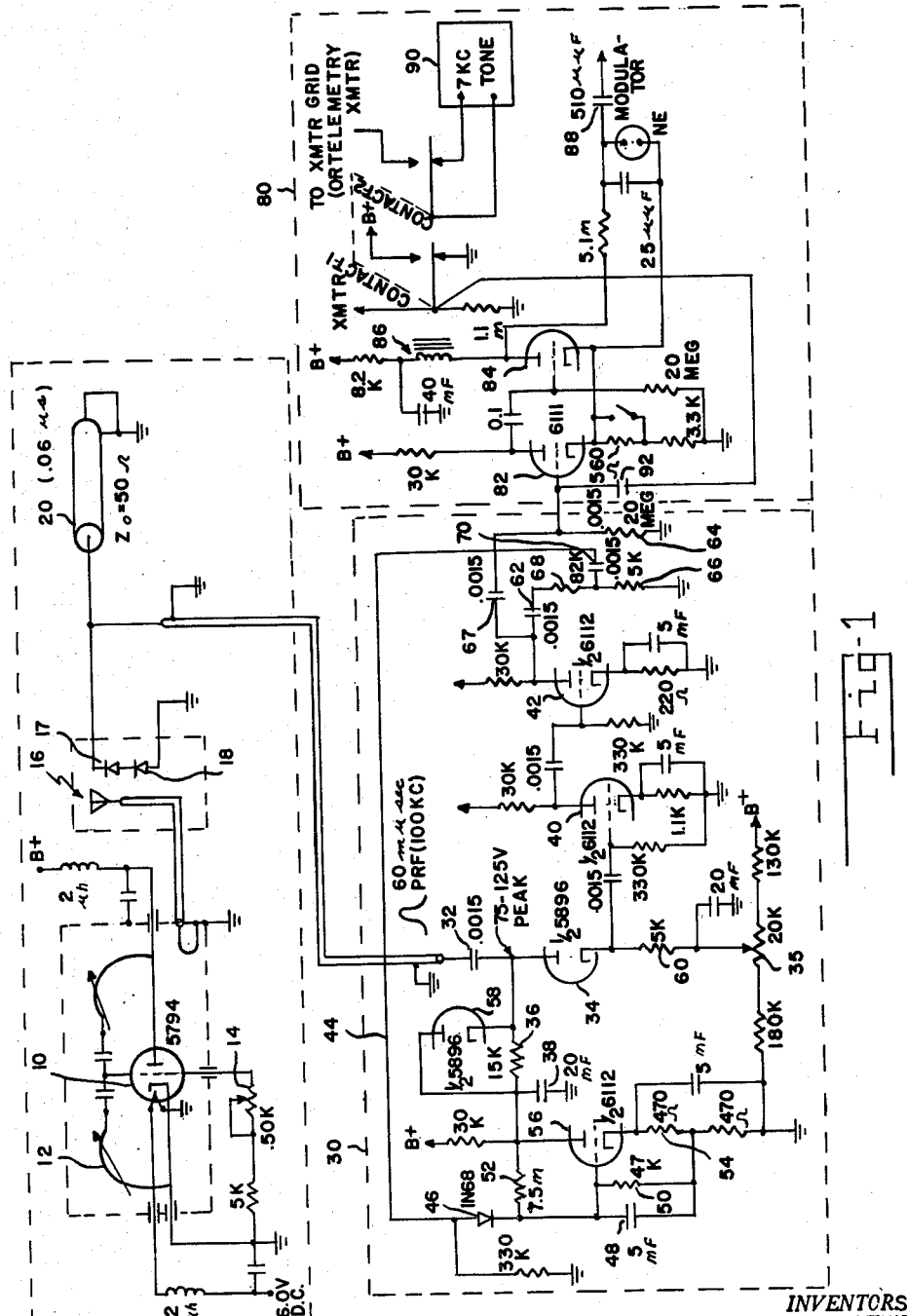
FIGURE 1 is a schematic illustration of the pulse Doppler/proximity scorer of the invention.

Referring now more particularly to FIGURE 1, there is shown within the radio frequency section 1 a self-pulsing radio frequency oscillator tube 10 which delivers short bursts or pulses of radio frequency energy. The oscillator in effect oscillates at two frequencies; the carrier frequency and the pulse repetition frequency. The carrier frequency is determined by the LC constants of the tank circuit 12. The pulse duration is determined by the RC constants of the grid circuit. The variable resistor 14 controls the pulse-repetition frequency. The radio frequency energy is delivered to the antenna 16 from which the energy is propagated into space. It therefore will be appreciated that oscillator 10 is a conventional form of self-quenching oscillator well known in the art by which intermittent or interrupted oscillations are produced. Oscillators of this type are covered in Radio Engineer's Handbook, F. E. Terman, McGraw-Hill Book Company, Inc., New York and London, 1943, p. 483.

While transmitting, the radio frequency oscillator tube 10 also acts as a receiver. The reflected target energy is picked up by antenna 16 and is simultaneously superimposed and amplified on the pulsed radio frequency carrier component in the oscillator tube 10. This action is similar to that of a conventional superheterodyne receiver-mixer stage. For example, the basic transmitter signal acts as the local oscillator, the reflected moving target signal acts as the incoming frequency, and the heterodyne frequencies, varying from a few cycles to several kilocycles above and below the transmitter frequency, act as the intermediate frequency. When there is received a reflected signal from a moving target in the oscillator tube, the signal is at a different frequency than the basic carrier frequency due to the Doppler/proximity and other phenomena. This causes strong images or intermediate frequencies to occur at various sums and differences above and below the carrier frequency. The addition of the out-of-phase frequencies causes amplitude changes which are detected in the receiver-detector stage. Since the selectivity is not a design criterion, the accumulation of compound frequencies greatly aids the sensitivity of the device while eliminating complex intermediate frequencies, limiter, and discriminator stages.

Figure 2:
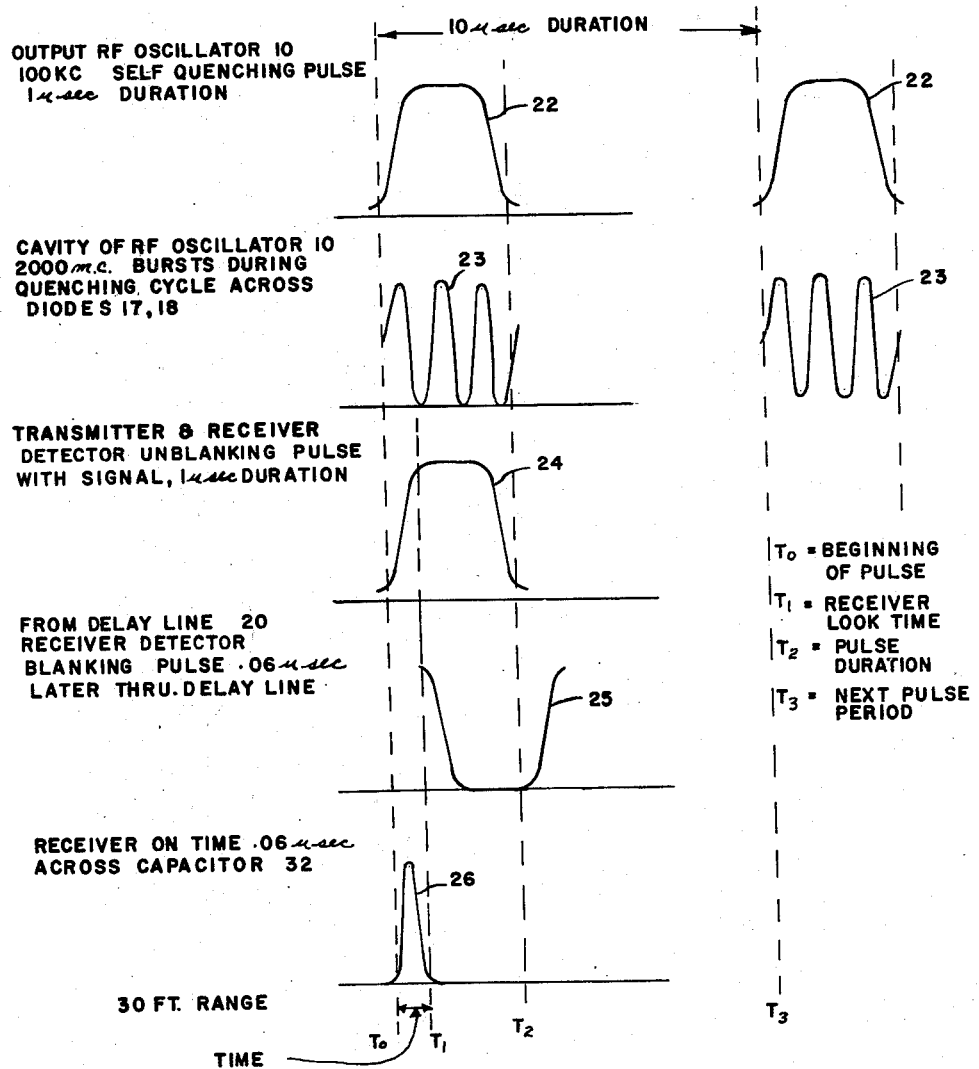
FIGURE 2 is a graph diagram indicating the time sequence of the pulses at various points in the radio frequency section of the scorer in the present invention.

The receiver-detector stage is made up of diodes 17 and 18 which are tightly coupled to the sensing antenna 16. Since the receiver-detector stage is coupled to the antenna, the output of the oscillator 10 is applied thereacross. The detected output of diodes 17 and 18 is delivered to the delay line 20. Receiver blanking occurs at this point as a result of the pulsed signal component being routed down the delay line medium 20 then returning 180° out-of-phase an instant later. The receiver blanking action may be understood with reference to FIGURE 2. The envelope 22 of a short burst of energy, that is, the output of the oscillator 10, contains for purposes of discussion 2,000 megacycles radio frequency energy of the waveform 23. The 2,000 megacycles burst or pulse is detected in the receiver-detector stage which has an output waveform 24. The output waveform 24 is delivered to the delay line 20 and returns 180° out-of-phase for the period as at 25. The waveforms 24 and 25 cancel each other in part and leave waveform 26 to be applied to the pulse reservoir circuit 30. The receiver "on time," or the ranging distance, is determined by the time it takes the basic signal to traverse the delay line 20. For example, the delay line could be a .06 microsecond line which corresponds to a radar range of 30 feet.

The pulse reservoir section 30 processes the pulses received from the radio frequency section 1 and determines if any frequency shifting occurs from pulse to pulse. Echoes from still targets are received through the receiver-detector and passed to the telemetry stage at a steady pulse level. This denotes the condition of no frequency change or no-target condition and is the proper environment for sensitivity adjustment. Moving targets within the antenna ranging sphere tend to cause a frequency shift, which in turn upsets the steady pulse amplitude level delivered to the telemetry section 80. Moving objects outside of this sphere will not be seen since the receiver is blanked from its own high-rise time pulse beyond the desired ranging distance as determined by delay line 20.

Figure 3:
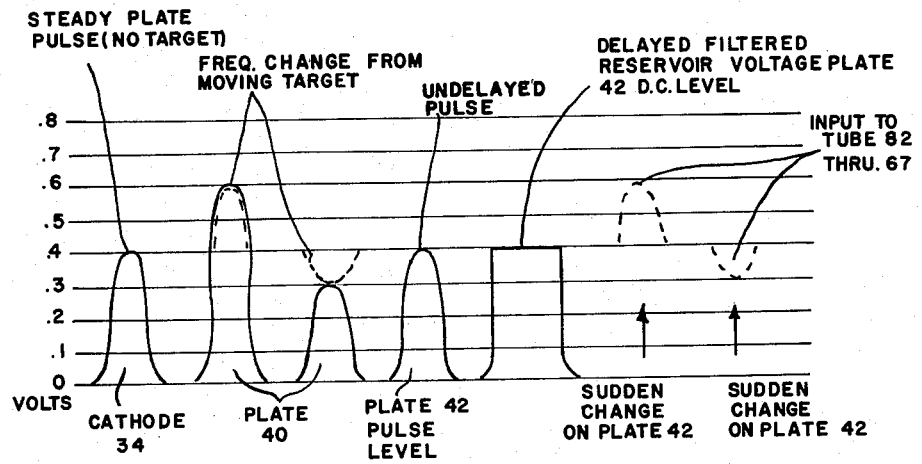
FIGURE 3 is a graph diagram indicating the typical waveshapes of pulses at various points in the pulse reservoir section of the scorer in the present invention.

The pulse reservoir section can be more fully understood with reference to FIGURES 1 and 3. The unblanked portion 26 of the pulse signal passes through capacitor 32 to the plate of tube 34 in the pulse reservoir stage 30. Conduction in tube 34 and subsequent amplification in the following two amplifier stages 40 and 42 occurs in response to each unblanked signal at the PRF rate. In the normal state, section 82 of the multivibrator is cut off and section 84 is conducting. In the anode circuit of section 84 a relay winding 86 is energized. However, by proper adjustment of the circuit parameters of the multivibrator, the multivibrator is not triggered from this condition merely due to the effect of a PRF signal alone. Thus, in the absence of an amplitude reflected signal occurring during the time the pulse reservoir is rendered operative, winding 86 of the relay remains energized. Simultaneously, a part of this amplified signal is fed back through connecting line 44 and diode 46 into the bias circuit network, capacitor 48, resistor 50, resistor 52, and resistor 54, tube 56. This feedback from the "no target" signal in conjunction with the plate feedback of tube 56 through resistor 52, permits the signal to establish its own reference. Compensation for "no target" pulse variations of ±25 percent and B+ variations of ±10 percent is achieved. Referring now specifically to the waveforms of FIG. 3, their significance will be considered according to the order in which they appear from left to right. During steady state conditions, a voltage is developed at the cathode of diode 34 in response to the pulsing of the pulse reservoir circuit. When a target is detected, the resulting reinforcement and cancellation attributed to Doppler phenomena produces a sine wave signal at the plate of triode 40. The respective undelayed and delayed pulses shown as appearing at the plate of triode 42 represent steady state conditions.

The final two dashed line waveforms identify a sine wave signal from which an indication of target penetration is derived.

Amplifier tube 40 receives only the top portion of the pulses for amplification through sensing network of tube 58, tube 56, resistor 36, and resistor 60. The remaining small pulse tops are further amplified in amplifier 42 where they are passed on to the telemetry stage 80 through capacitor 67 and resistor 64. The network including capacitor 62, resistor 66, and resistor 68 selects small signal increments at the plate of amplifier tube 42 for feedback through capacitor 70 into the biasing network of vacuum tube 56. The conduction level of tube 56 establishes the level of reservoir voltage of capacitor 38 for comparison. The tube 58 clips negative overshoots from the incoming signal to enhance the pulse fidelity. The plate of tube 34 is coupled to the reservoir voltage level of capacitor 38 through resistor 36. Biasing resistor 35 determines the top portion amount of the pulse to be fed to amplifier tube 40 for amplification. Those skilled in the art will understand that as used in the present description the top portion of the pulse, the pulse tops, and like phraseology, refer to that increment of the signal which is in excess of the magnitude of the signal which appears during steady state conditions, i.e., with no target detection.

The reservoir action which determines the charge across capacitor 38 is accomplished through the conduction level of tube 56. This level is controlled by voltage variations being fed from the plate of tube 56 through resistor 52 into the bias network. Further control is achieved by small signal increments from amplifier 42 being fed across diode 46 into the network. Any slow change of the B+ or "no target" signal pulse within its regulatory limits causes the voltage comparison level in capacitor 38 to change for correct topping of the pulses originally established by resistor 35. Rapid increases, as indicated in the FIGURE 3 graph, in the pulse level resulting from missile penetration pass on through the amplifier stages to the telemetry section 80 to signal a hit. Due to the extremely long time constants involved, the reservoir level of capacitor 38 cannot react to rapid changes in the pulse level resulting from missile penetration, therefore, the signal is passed for amplification. Through this action a pulse on the top of a pulse is detected.

The rapid increases in the pulse level due to the missile or moving target penetration causes an output from the last amplifier stage 42 of the pulse reservoir stage. The output is applied to the grid of the first stage 82 of the multivibrator of the telemetry section 80. The multivibrator is thereby triggered and relay 86 deenergizes since section 84 becomes cutoff. The output from capacitor 88 is used to modulate a separate telemetry transmitter (not shown). Contact-2 of the relay 86 is used to pick up the 7-kilocycle tone oscillator 90 and modulate the grid of oscillator tube 10 for one second time duration. An external receiver tuned to radio frequency oscillator 10 announces a hit when its 7-kilocycle tone channel is activated. Upon closure of contact-1, B+ is applied through capacitor 92 to the grid of tube 82 for stability, causing it to lock in tightly and hold for one second.

Figure 4:
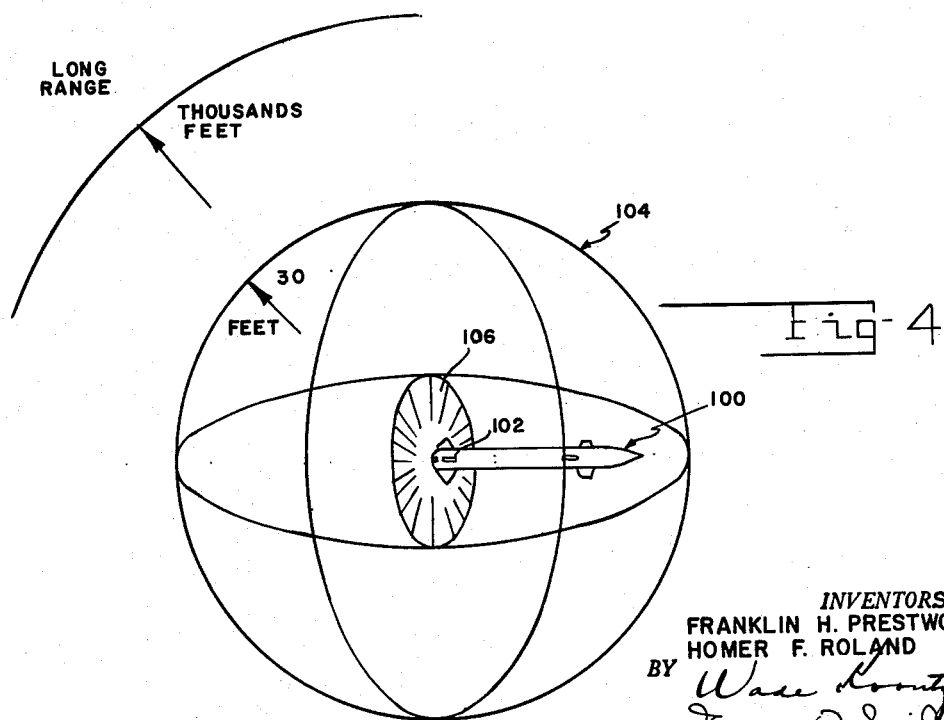
FIGURE 4 is an illustration of the spherical ranging field about the target.

FIGURE 4 illustrates a spherical ranging field about the target which is carrying the pulse Doppler/proximity scorer of the present invention. The target 100 has the scorer mounted on its end 102. Assuming the delay time to be .06 microsecond which corresponds to a radar range of 30 feet, the spherical ranging field is indicated at 104. There is a highly uniform antenna pattern established about the target 100, since the look-distance is based on the properties of propagation time rather than the conventional system sensitivity. The system sensitivity would be down at certain null points, however, the same as conventional scorers. These null points would be compensated in most cases when using an antenna with reasonably good coverage since the device is operated at maximum sensitivty. A typical dead-time distance is 4 feet as indicated at 106. The spherical ranging field can have a radius of from a few feet to thousands of feet. The ranging distance is, of course, variable as explained above, by plugging in various pulse duration transformers 20.

While a specific embodiment of the invention has been described in detail by way of illustration, it is understood that the invention is defined solely by the appended claims and embraces any embodiments falling within the term and spirit thereof.

We claim:

1. Apparatus for determining the miss distance between a missile and an airborne target comprising:

an antenna carried by said target;

transmitting means aboard said target for supplying repetition pulses at radio frequency to said antenna;

a detector coupled to said antenna in energy-receiving relation having an output lead and supplying to said lead detected repetition pulses of essentially constant amplitude when said missile is at a relatively great distance from said target;

said detector when reflections from a missile closing with said target appear supplying to said lead detected repetition pulses which have an amplitude substantially greater than said constant amplitude due to phase addition of transmitted and reflected waves caused by Doppler phenomena;

pulse reservoir means coupled to said lead having the characteristics of registering a lack of missile proximity when only said constant amplitude pulses are applied thereto but, in response to said greater amplitude pulses, denoting a relatively close distance between said missile and target, and a delay line coupled to said lead in which detected signals incident thereto and to said pulse reservoir means are balanced by a reflected signal of opposite phase effective to produce cancellation of the incident and reflected signals after a time delay terminating before the end of each transmitted pulse whereby said pulse reservoir means is blanked by said cancellation.

2. Apparatus for determining miss distance as claimed in claim 1 wherein the time delay of said delay line effective to produce cancellation of incident and reflected signals is adjustable whereby the unblanked operating time of said pulse reservoir means is adjustable.

References Cited in the file of this patent

UNITED STATES PATENTS

| | | |
|---|---|---|
| 2,866,192 | Johnson et al. | Dec. 23, 1958 |
| 2,980,905 | Gratian et al. | Apr. 18, 1961 |
| 2,992,422 | Hayes | July 11, 1961 |